United States Patent [19]
Forkner

[11] 3,711,788
[45] Jan. 16, 1973

[54] LASER APPARATUS
[75] Inventor: John F. Forkner, Plymouth Meeting, Pa.
[73] Assignee: Philco-Ford Corporation, Blue Bell, Pa.
[22] Filed: Feb. 27, 1969
[21] Appl. No.: 842,036

Related U.S. Application Data
[62] Division of Ser. No. 346,820, Feb. 24, 1964, Pat. No. 3,434,073.

[52] U.S. Cl..................................331/94.5, 350/160
[51] Int. Cl..................................H01s 3/11
[58] Field of Search......331/94.5; 350/160; 332/7.51

[56] References Cited

UNITED STATES PATENTS

| | | |
|---|---|---|
| 3,274,512 | 9/1966 | O'Kaya....................331/94.5 |
| 3,310,753 | 3/1967 | Burkhalter..............331/94.5 |
| 3,328,112 | 6/1967 | Soules et al.............331/94.5 |
| 3,315,117 | 4/1947 | Benson....................331/94.5 |

Primary Examiner—William L. Sikes
Attorney—Carl H. Synnestvedt

[57] ABSTRACT

A relatively high-speed optical shutter for use in the optical system of a laser for greatly increasing its peak power output. In one aspect, the optical shutter comprises a system of prisms arranged to cause multiple impingement of the internal laser beam on a rotatable mirror, whereby to multiply the angular sweep rate of the laser beam as it is reflected back into the laser medium. In another aspect, the optical shutter includes a telescope arranged to increase the apparent rotational speed of the mirror, and hence the angular sweep rate of the beam, by magnifying the width of the beam reflected back into the laser medium.

20 Claims, 14 Drawing Figures

INVENTOR.
JOHN F. FORKNER

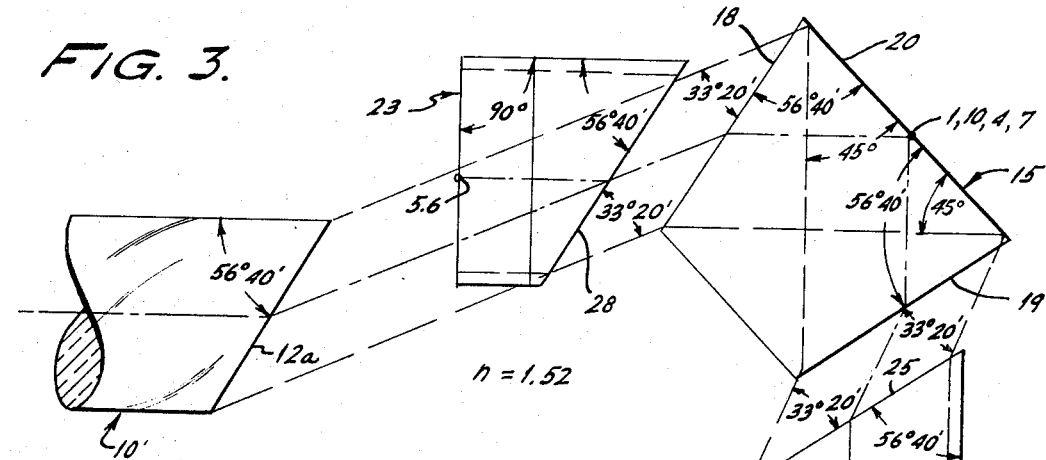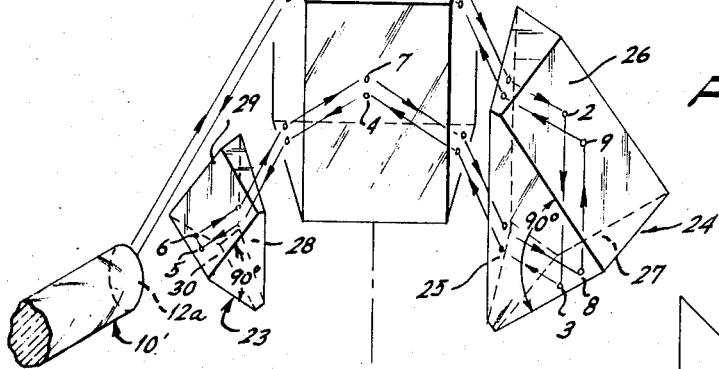

INVENTOR.
JOHN F. FORKNER
BY
Harry W. Hargis III
AGENT

LASER APPARATUS

This is a division of application Ser. No. 346,820, now U.S. Pat. No. 3,434,073 filed Feb. 24, 1964.

This invention relates to laser apparatus, and more particularly to improvements in so-called Q-spoiling devices of giant-pulse lasers.

In one known form of laser the working element is a single crystal of pink ruby in the form of a cylindrical rod, of for example about one-half centimeter in diameter and 4 centimeters in length, and having flat end faces that are plane to a high degree of accuracy. The ruby rod is disposed between two parallel reflecting surfaces, at least one of which may be formed on the end of the rod. One surface is completely reflecting and the other surface is only partially reflecting. The ruby rod is irradiated, or "pumped", laterally of its axis by light from a high intensity light source, such as a flash lamp, operated usually for a few milliseconds at a time with an input of relatively high value. A fraction of the energy emitted by the flash lamp is absorbed by the ruby crystal. When the energy absorbed from the exciting irradiation exceeds a certain threshold, and a very short time after the start of irradiation, coherent radiation emerges in a narrow beam through the partially reflecting surface which forms one end of the resonant optical system of the laser.

The intensity of the laser beam varies irregularly, it having been observed that the time delays between the start of excitation and the onset of coherent oscillations are not uniform in spite of efforts to keep all experimental variables under control. Once coherent light appears, its intensity will vary greatly and irregularly with "spikes", or pulsations, of durations of about 1 microsecond.

It is possible to overcome the aforementioned irregularities and to increase the peak intensity of the output pulse by temporarily lowering or "spoiling" the Q of the optical system of the laser. By this so-called Q-spoiling the laser crystal can be irradiated, or pumped, past the normal threshold value at which it begins to emit coherent radiation. After the pumping irradiation has attained a condition of saturation, the optical characteristics of the system are again modified by suddenly raising or, "unspoiling", the Q, with the result that a relatively large burst of radiant energy is emitted by the crystal. For example, a conventional laser system which would normally produce a series of spikes having a peak power of 50 kilowatts when operated in the manner just described may achieve a peak output of 5 megawatts. Systems of this type are known in the art as giant-pulse laser systems.

Q-spoiling in the optical system of the laser normally is accomplished by means of a light shutter placed between the ruby rod and one of the reflecting surfaces, or by rotating out of alignment means comprising, for example, a rotating prism or mirror which serves as the fully reflective surface for one end face of the crystal. In this system the pumping or irradiating lamp is triggered to flash so that the pumping begins just before the shutter is opened, or just before the rotating reflective mirror or prism is brought into optical alignment with the end of the laser crystal. The amplitude of the pulse produced is dependent to a large extent upon the rapidity with which the shutter is opened or the reflective surface is brought into optical alignment.

It is an objective of this invention to provide, in a Q-spoiling system as described, optical means operative greatly to multiply the effective rotational rate of the reflective means.

It is a further objective of the invention to provide, in a giant pulse laser apparatus, optical means to increase the effective operating speed of the shutter.

The invention contemplates, in one form thereof, that the reflective means comprises a rotating-mirror shutter considerably larger in diameter than the cross-section of a ruby crystal, and interposing a telescope between the rotating mirror and the end of the ruby crystal. In this embodiment the effective rotational rate of the mirror is proportional to the product of its actual rotational rate and the magnification of the telescope.

The invention further contemplates that the laser Q-spoiler may comprise a plurality of prisms, one of which is rotated. The optical path between the two reflecting surfaces of the laser optical system is folded so that energy emitted by the laser rod is caused to be reflected by a face of the rotating prism a plurality of times. This may be achieved by means of suitably positioned, stationary reflectors, such for example, as roof prisms. The multiple reflections from the rotating prism have the effect of multiplying the apparent speed of rotation of the rotating prisms. Thus an increase in the apparent speed of the Q-spoiling action is achieved advantageously without an increase in the prism rotation rate.

Still further it is contemplated by the invention that the above-described telescope and rotating prism arrangements may be combined to achieve still faster, high frequency shutter operation.

The invention may therefore be briefly summarized as comprising a combination of: a working element capable of laser action; reflective shutter means disposed and adapted to reflect radiation emitted by said element back into the latter; means for establishing the operating speed of said shutter means; and means operable optically to modify the effective operating speed of the shutter.

For a more complete understanding of the invention, reference may be had to the following detailed description, taken in light of the accompanying drawings in which:

FIG. 2 is a perspective view, on a reduced scale, of a portion of the apparatus illustrated in FIG. 1, and in which one of the elements has been modified slightly;

FIG. 3 is a plan view of the apparatus illustrated in FIG. 2;

FIG. 4 is a somewhat diagrammatic showing of apparatus illustrated in FIGS. 1 to 3, and demonstrating the optical principles upon which the invention is based;

FIG. 5 is a further diagrammatic showing of the optical principles of the invention;

Figure 1:
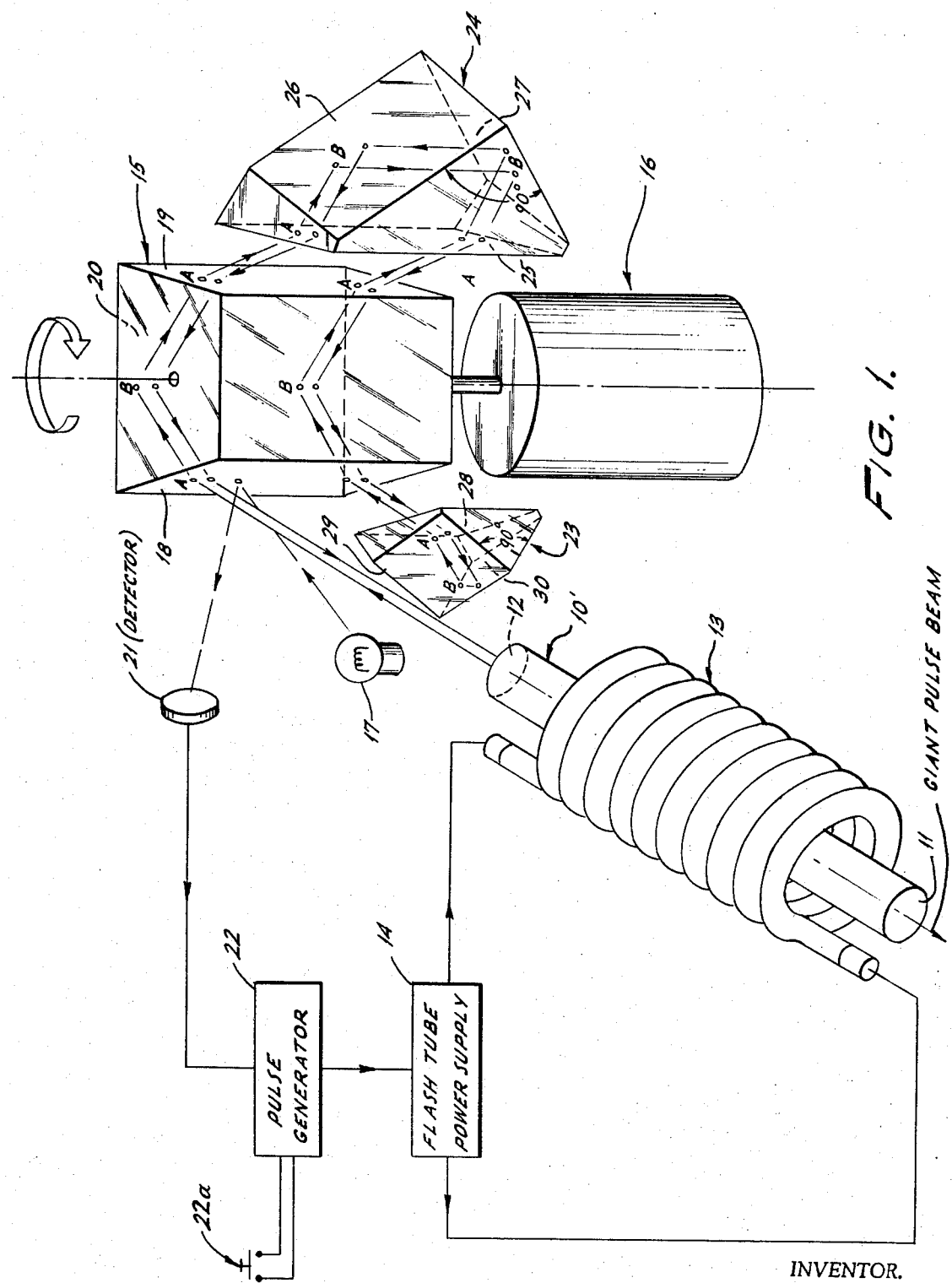
FIG. 1 is a somewhat diagrammatic showing, partly in perspective, of giant-pulse laser apparatus embodying the invention.

With more particular reference to FIG. 1, laser apparatus embodying the invention comprises a cylindrically formed crystal 10' of suitable material, for example pink ruby, having end faces 11 and 12 that are plane to a high degree of accuracy. End face 11 is provided with a partially reflective coating and face 12 has no reflective coating. A helically formed Xenon flash tube 13 is coiled about crystal 10', and is energized by a suitable power supply 14 of known construction. A rotatable prism 15 is drivingly coupled with a motor 16, and a lamp 17 is disposed and adapted to emit a beam for sequential reflections by external faces of rotating prism 15 onto a detector 21. Reflections by rotating prism 15 of the light beam from lamp 17 will reach detector 21 according to the sequential positional relationships of the outer reflective faces of the prism 15. Detector 21 is constructed and arranged to actuate a pulse generator 22 which in turn triggers power supply 14, as the face 18 of the rotatable prism reaches the position shown, in which position said face reflects the beam onto the detector.

As a practical matter, in view of the relatively high rotational rate of prism 15 and compared with the time required for flash lamp 13 to fire, a typical pulse rate is one per 10 seconds, as may be provided by an operator who actuates a trigger or push-button switch, such as is seen at 22a, to fire the laser. The illustrated synchronizing system, upon actuating the trigger switch, operates to fire as the prism 15 is rotated into beam reflecting position, or just prior to such optical alignment of prism 15 as to provide for return of the emitted beam to non-reflecting end 12 of laser rod 10'.

The Q-spoiling means comprises stationary prisms 23 and 24 so optically positioned as respects one another and rotatable prism 15, as to provide the illustrated light paths to and from the light transmissive or non-reflective end face 12 of ruby crystal 10', in accordance with the directional arrows. It will be appreciated that the complete light paths exist only for the illustrated position of the rotatable prism 15, just following energization of Xenon lamp 13. The several prisms therefore comprise the fully reflective means for end face 12 of the laser rod, and as will be described in what follows, rotation of prism 15 alternately spoils and restores the Q of the laser optical system.

In FIG. 1, locations of all rays of light entering or leaving the prisms are designated by the letter A. The light rays leaving the end 12 of rod 10' are polarized in a vertical plane, and the prism dimensions and angles are selected so that such rays enter and leave at the so-called Brewster angle at which no reflection losses occur for incident light polarized in the plane of incidence. The Brewster angles are designated in FIG. 3 by their actual values, and are based on materials having a refractive index of 1.52. However, it will be understood that these values are for illustrative purposes only, and materials having other refractive indices may be used.

All reflections inside the prisms are designated by the letter B and occur at less than the critical angle. Hence, these reflections are lossless, or totally internal. The only losses within the optical system comprising the shutter and reflector means are due to the prism material itself. These losses can be minimized substantially by selecting the proper material for the wave length of the light emitted by ruby crystal 10'.

It will be noted that the difference between the apparatus illustrated in FIG. 2 and the corresponding apparatus illustrated in FIG. 1 is that the ruby rod or crystal 10' shown in FIG. 2 has its non-reflective face 12a cut at the Brewster angle, whereas the corresponding face 12 in FIG. 1 is cut normal to the major axis of the rod. Also it will be noted in FIG. 2 that the letters A and B have been replaced with numerals 1 to 10 that correspond to the sequential paths of the light beam through the prisms, as will be more fully discussed in what follows.

It can be shown, and as will be more fully understood from the equivalent mirror systems illustrated in FIGS. 4 and 5, that upon rotation of prism 15 through a predetermined given angle, beams reflected, as at points B in this prism, will each be rotated or swept through twice the said given angle. It follows, therefore, that each reflected beam sweeps at double the rotational rate of the reflective surface. Since there are four such reflections, the returning beam will sweep across the end of the laser rod at an angular speed 8 times the rotational speed of prism 15.

While the light rays or beams in FIG. 1 and 2 are shown as being spaced for the sake of clarity in tracing the path of the beam from and to the rod in restoration of reflection, or "unspoiling" of the Q, the corresponding rays are illustrated as coincident rays in FIG. 3. Rays to either side thereof also have been included to indicate the limits of the lateral disposition of the rays.

With particular reference to FIG. 2, and assuming that Xenon lamp 13 has just been fired to irradiate rod 10', an emitted beam leaving the end 12a of laser rod 10' will enter face 18 of rotating prism 15, thereafter to impinge upon reflection pint 1 on face 20, from which the beam will be reflected to leave face 19 of the rotating prism. The beam will then enter the vertical face 25 of stationary roof prism 24 thereafter to impinge upon reflection point 2 which lies in the plane of the sloping face 26 of prism 24. The beam then will be deviated through a 90° angle to impinge upon reflection point 3 on the lower sloping face 27 of prism 24, and at this point the beam will be deviated again through a 90° angle to emerge from the vertical face 25 of prism 24 and will enter the vertical face 19 of rotating prism 15. The beam then will be deviated through a 90° angle (other angles of deviation could be used provided that total internal reflection occurs at surface 20) by reflection at point 4 to emerge from the vertical face 18 of prism 15 and enter the vertical face 28 of prism 23. The beam is then turned 180° by successive reflections at points 5 and 6 upon surfaces 30 and 29, respectively, to emerge from vertical face 28 of prism 23 and enter vertical face 18 of rotating prism 15. The beam then will be reflected at point 7 on face 20, emerge from vertical face 19 of prism 15, and enter vertical face 25 of prism 24 to be turned 180° by successive reflections from points 8 and 9 on faces 27 and 26, respectively. The reflected beam again will emerge from the vertical face 25 of prism 24 and enter vertical face 19 of prism 15, reflected at point 10 on face 20 to emerge from the other face 18 of prism 15 and return in a sweeping motion to end 12a of laser rod 10'. Shortly thereafter a giant pulse beam is emitted from partially reflective face 11, as indicated in FIG. 1.

By virtue of the rotation of prism 15, the beam returned in restoration of reflection will have been deviated twice the angle through which the prism has turned for each of internal reflections 1, 4, 7, and 10 by face 20. Accordingly the sweep rate of the returning beam will be eight times the rotational rate of prism 15, and substantially complete reflection will be achieved only for the very short period that the returning beam impinges on the laser rod. Importantly, the Q is restored with such rapidity as to produce a giant-pulse, the ideal condition for achieving a giant-pulse being the restoration of Q from zero to maximum in zero time. If the Q is restored with insufficient rapidity, no giant pulse will occur.

It will therefore be appreciated that the alternate spoiling and restoring of the optical path occurs more rapidly than with single mirror systems heretofore used. Also, it will be appreciated that the rotational speed of the rotatable prism can be further multiplied optically by inclusion of additional reflective prisms positioned to reflect the beam back into the rotating prism prior to return of the beam to the laser rod.

In the interest of further describing the invention and with reference to FIG. 4, the prisms of the optical system illustrated in FIGS. 1, 2, and 3 have been replaced generally by mirrors bearing the same reference numerals as the corresponding prisms but with the suffix $a$ applied.

To simplify the FIG. 4 showing, the double reflection points of prisms 23 and 24 have been replaced with single reflection points — for example points 2 and 3 are combined as point 2, 3, points 5 and 6 as point 5, 6, and points 8 and 9 as point 8, 9.

The numbers 1 to 10 therefore correspond generally to the reflection points similarly designated in FIGS. 2 and 3. In FIG. 4 the mirror 15a has been rotated through an angle $\delta$ and reflection points 1, 4, 7, and 10 have been taken at the rotated positions of the mirror 15a.

Maximum Q, or substantially complete reflection, is obtained with reflection occurring while mirror 15a is in the illustrated non-rotated position. Points of reflection affording maximum Q are indicated by numerals 1″ to 10″, and by notation directed to mirror 24a. In the position of mirror 15a at which maximum Q occurs, the illustrated emitted ray is returned to the laser rod substantially along the same path as it left. In terms of the reference numerals, the emitted ray first is reflected at point 1″ on mirror 15a, thence impinges at "point" 2″, 3″ on mirror 24a, and is reflected back onto point 4″ on mirror 15a from which it is reflected onto point 5″, 6″. The ray then is caused to follow the same path with reflections at point 7″ on mirror 15a, point 8″, 9″ on mirror 24a, back to point 10″ on mirror 15a for return to the laser rod along the line on which the ray was emitted. While points 1 and 1″ have been illustrated as being substantially coincident, it will be understood that the point 1 will have been displaced slightly due to rotation of mirror 15a.

With reference to FIG. 5, mirror 24a has been folded about the illustrated rotated position of mirror 15a. In the resulting diagram, for each time the beam strikes the mirror 24a (at points 2, 3 and 8, 9) the beam is deviated 4 times the angle of rotation $\delta$ of prism 15a. Since the mirror 24a is struck twice — 2, 3 essentially are the same points, as are 8, 9 — the total deviation is eight times the angular rotation of the rotating mirror 15a. Considered another way, it can be demonstrated, using the geometry of FIG. 5, that since the normals to the mirror through points 2, 3 and 8, 9 are parallel, then the total deviation is the sum of the original angle of incidence ($2\delta$) and the final angle of reflection ($6\delta$), i.e. $2\delta + 6\delta = 8\delta$, as indicated on the diagram.

Since the returning beam sweeps at eight times the angular rotational rate of the prism 15, the effective shutter operation, in restoring the reflection, occurs in a fraction of the time achieved with a simple rotating mirror optical system.

Figure 6:
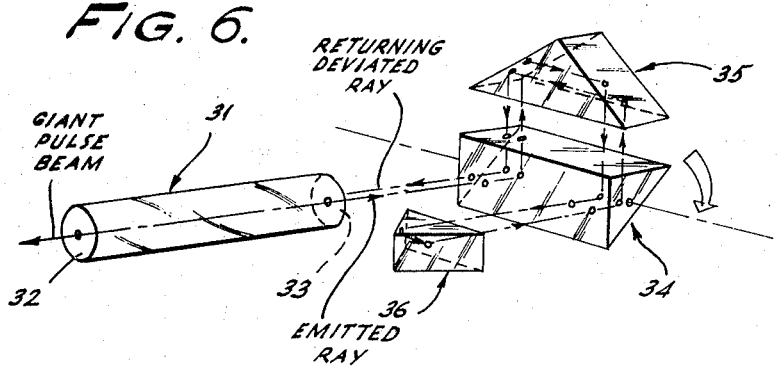
FIG. 6 is a view similar to FIG. 2 and illustrating a modified embodiment of the invention.

With reference to the modified embodiment of the invention illustrated in FIG. 6, laser rod 31 has a partially reflective end face 32 and a substantially non-reflective, light transmissive end face 33. Prism 34 is rotatable about its longitudinal axis, has the cross-section of a 45° × 45° × 90° triangle, and is in optical alignment with laser rod 31, and also with a stationary 45° × 45° × 90° roof prism 35, and a like but smaller, stationary roof prism 36. In the illustrated position of the rotatable prism, and for the sake of convenience, the ray of light emitted from face 33 of laser rod 31, immediately following irradiation of the same, is shown as returning along a path parallel to the path along which it is emitted in restoring the Q of the system. The light ray will travel from rod 31 for multiple reflections by the prisms 34, 35, and 36, and return to the rod 31 via the paths to which directional arrows have been applied. Thereafter, the giant pulse is emitted from the partially reflective end 32 as shown. In such an arrangement, as was the case with the apparatus illustrated in FIGS. 1 to 5, wherein the angle of deviation was increased by twice the angle of prism rotation for each of four reflections by the rotating prism, the ray returning to the rod 31 will have a sweep rate eight times the rotational angular velocity of prism 34.

Figure 7:
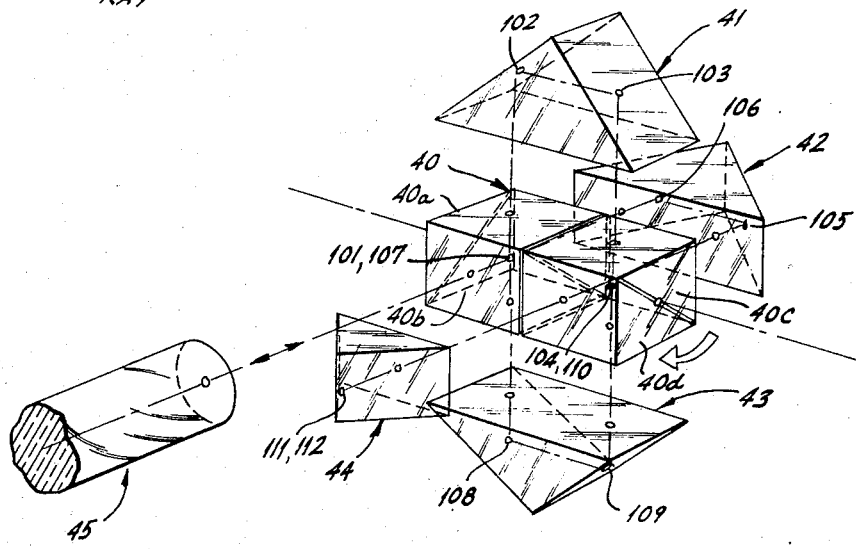
FIG. 7 is a view similar to FIG. 6 and illustrating another modified embodiment of the invention.

In FIG. 7 there is illustrated a modification of the apparatus shown in FIG. 6, the reflecting faces of the rotating prism 40 being doubled as compared with prism 34 of FIG. 6, and the number of roof prisms being increased to four, as seen at 41, 42, 43 and 44. There are eight reflections by the rotating prism of this system to make the sweep rate of the emitted ray of light 16 times the prism angular velocity.

With more particular reference to FIG. 7, each of prisms 41, 43, and 44 has the same configuration as prisms 35 and 36, for example, in that their roof surface portions lie in planes disposed at right angles to one another. The rotating prism 40 comprises two rotatably mounted pairs of 45° × 45° × 90° cross-sectional prisms 40a, 40b, 40c and 40d with hypotenuse faces spaced approximately 0.005 in. apart. The mating hypotenuse faces of one pair of prisms (40a and 40b) are disposed at a right angle with respect to the mating faces of the other pair (40c and 40d).

In the interest of clarity, the rays entering and leaving the several prisms are illustrated as travelling along the same light paths, and will be traced by means of numbers applied to the reflection points. Starting with the ray as it leaves the laser rod following irradiation, it will first impinge at 101 upon the reflective face of prism 40a to be reflected upward for successive reflections at 102 and 103 by sloping faces of roof prism 41. The ray leaves prism 41 to impinge at 104 upon the reflective face of prism 40c for successive reflections horizontally at 105 and 106 by sloping faces of roof prism 42. The ray then enters prism 40b to be reflected at 107 on its reflective face downwardly into roof prism 43 for successive reflections at 108 and 109. The ray then travels upwardly to enter prism 40d for reflection at 110 on its reflective face, the ray then leaving the rotating prism to enter roof prism 44 for successive reflections at 111 and 112, from the sloping faces of this prism. Since the emitted and returned rays are being considered as coincident, points 111 and 112 also are coincident, and the ray can be described as returning to the laser rod from point 112 by successive return reflections at points 110, 109, 108, 107, 106, 105, 104, 103, 102, 101.

Whereas the embodiment illustrated in FIG. 6 restores reflection to the system, or unspoils the Q, substantially eight times faster than a simple rotating mirror, the embodiment illustrated in FIG. 7 achieves Q restorations substantially sixteen times faster than does a simple rotating mirror.

Figure 8:
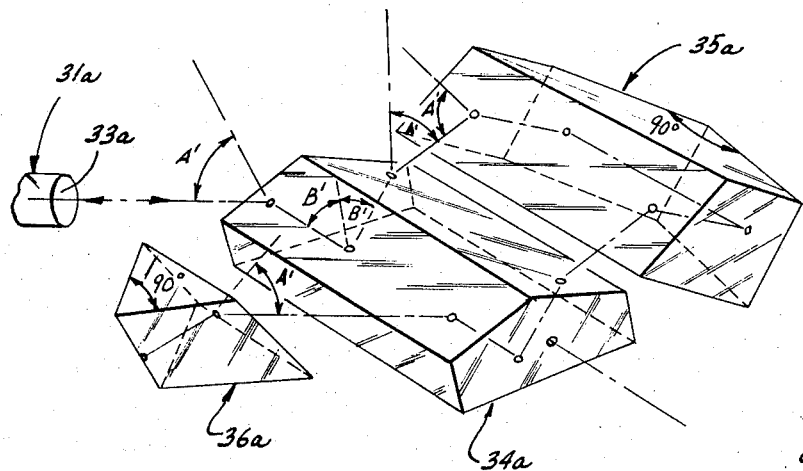
FIG. 8 is a view similar to FIGS. 6 and 7 and illustrating a further modified embodiment of the invention.

The apparatus illustrated in FIG. 8 is similar to that shown in FIG. 6, with the exception that the prisms are so shaped and disposed that the angle $A'$ at which the light enters a prism — each identified by the same reference numeral as the corresponding prism in FIG. 6, with the suffix $a$ — is the Brewster angle for the prism material. Therefore, no reflection losses occur at external surfaces of the prisms for light polarization in the vertical plane, as is the light beam leaving the laser rod. The internal angles of reflection $B'$ are greater than the critical angle for the prism material and hence total reflection occurs in the rotating prism 34a. The reflection angles $B'$ in the two stationary prisms 35a and 36a of the same material also are total reflections. As is the case with apparatus shown in FIG. 6, this arrangement produces an angular sweep of the energy returning to the laser rod at a rate 8 times the rotational rate of the rotating prism, and is thus substantially four times as rapid in sweeping the beam as is a simple mirror.

Figure 9:
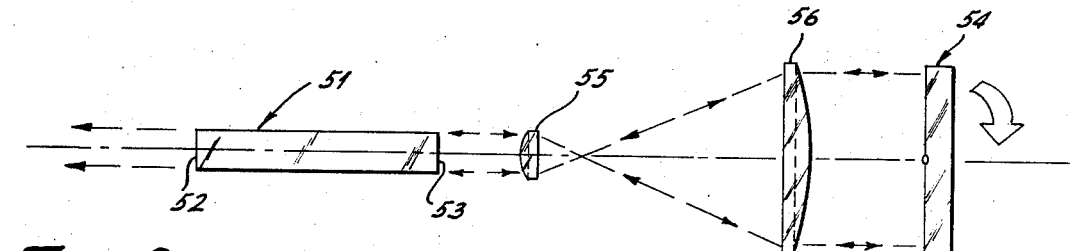
FIGS. 9 through 12A comprise additional modified embodiments of the invention, in which different optical systems are utilized.

Turning now to the modified embodiment of the invention illustrated in FIG. 9, a laser rod 51 having partially reflecting face 52 and a non-reflective face 53 is optically aligned with a rotatable plane mirror 54. The optical equivalent of a telescope is interposed between the non-reflective end 53 of laser rod 51 and the mirror 54, the telescope comprising a plano-convex eyepiece lens 55 and a like objective lens 56, each arranged as shown. Mirror 54 and objective lens 56 are of the same diameter, larger than the cross-sectional area of laser rod end 53.

The paths of light rays emitted from and reflected onto non-reflecting end 53 of the rod 51 are indicated for convenience as travelling the same paths in either direction, and under condition of maximum reflection. The path of the giant pulse beam is indicated by arrows emanating from the partially reflecting face 52. While means for irradiating rod 51 has not been illustrated, it will be appreciated that an arrangement similar to the one illustrated in FIG. 1 may be utilized.

The gain of the telescope in FIG. 9 effectively multiplies the rotational rate of the mirror inasmuch as the beam width emitted by end face 53 is magnified to the width of mirror 54 for a given rotational rate of the mirror. It follows, therefore, that if a wider reflected beam is swept at the angular rotational rate afforded by the roating mirror, a resultant increase in beam velocity across the end 53 of rod 51 is achieved. For example, if mirror 54 rotates at 20,000 rpm, a telescope having a gain of 5 has the effect of a smaller diameter mirror rotating at 5 times 20,000 rpm, or 100,000 rpm.

This principle of shutter speed magnification may be set forth as follows, using exemplary values as tabulated:

| | |
|---|---|
| Laser rod diameter | 0.25 inches |
| Laser beam width | 10 sec. arc (half-angle) |
| Mirror angular velocity | 24,000 rpm (400 rps) |
| Telescope magnification | 5X |
| Diameter of objective lens 56 and mirror 54 | 5 × 0.25 or 1.25 inch |

Pulse Duration =

$$\frac{10 \text{ sec. arc}}{(2) \times (5) \times 400 \text{ r.p.s.} \times 360 \frac{\text{degrees}}{\text{rev.}} \times 3600 \text{ sec. arc/degree}}$$

Pulse Duration = $2 \times 10^{-9}$ seconds (time)

The factor (2) in the denominator represents the increase in sweep rate due to rotation of mirror 54.

Figure 10:
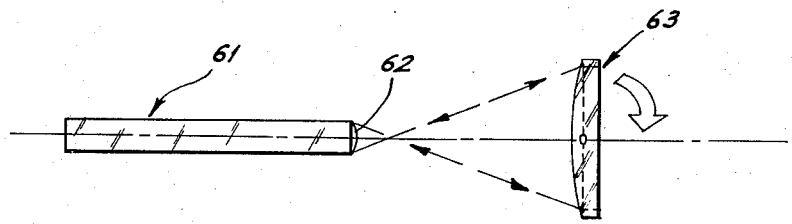

In FIG. 10, the embodiment illustrated in FIG. 9 has been modified substantially by making the non-reflective end of a laser rod 61 into a convex surface 62 and making the non-reflective surface of the rotatable mirror 63 convex as shown. This arrangement achieves the same magnification of the rotational speed of the mirror as does the embodiment shown in FIG. 9, since the reflected beam width is again increased to that of the rotating mirror 63.

In the apparatus of both FIGS. 9 and 10 the beams include crossover points which can produce an energy concentration sufficient to ionize air in the region thereof. This latter problem, should it arise, can be overcome by the lens arrangement illustrated in FIG. 11, in which the non-reflective end 67 of the laser rod 66 is made concave, and the rotatable mirror 68 is the same as the mirror 63 of FIG. 10. The concavely curved surface of laser rod 66 serves as a negative lens, and in combination with curved rotatable mirror 68 comprises a Galilean telescope.

Figure 11:
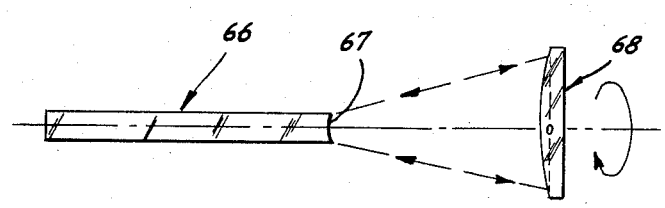
Figure 11A:
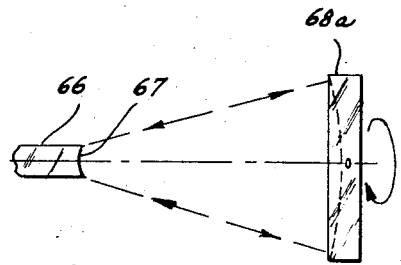

The rotatable mirror of FIG. 11 can be also modified, if desired, to take the concave form 68a shown in FIG. 11a, in which the concave surface is made reflective.

Figure 12:
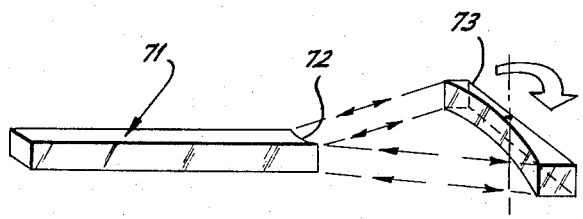

Still further modified apparatus embodying the invention is illustrated in perspective in FIG. 12 and is similar to that illustrated in FIG. 11a. The primary difference is that the laser rod 71 is rectangular in cross section and its concave, non-reflective end 72 projects rays onto a similarly rectangular concave reflective face of a rotatable mirror 73. In this rectangular arrangement each of the curved surfaces is cylindrical, and magnification is normal to the axis of rotation of the mirror 73. An advantage of this arrangement is that the mass of the rotating mirror is less than that of one with a generally spherical reflective surface, as in the previous example.

Figure 12A:
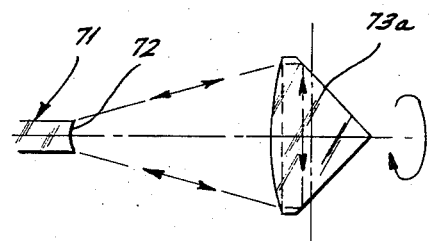

In FIG. 12A, the rotatable mirror of FIG. 12 has been replaced with a rotatable roof prism 73a provided with a convex face disposed for alignment with the concave face of the laser rod once for each revolution of the prism, and the light paths again are indicated by means of arrows.

In any of the embodiments illustrated in FIGS. 9 to 12A, the relatively large reflective surfaces reduce the power density at these surfaces, whereby there is less energy concentrated in the optical system. This characteristic permits operation at higher energy levels without damage to reflecting surfaces.

From the foregoing description it will be appreciated that the invention affords means for advantageously increasing the effective speed of a mechanical shutter for a laser device by optical means disposed in novel cooperative relationship with the shutter and the working element of the device.

I claim:

1. In laser apparatus, a working element capable of laser action and including a light transmissive face, reflective shutter means for reflecting radiation emitted by said working element back onto said face, comprising a rotatable mirror disposed and operative in one of its rotated positions to reflect radiation emitted by said element, means for establishing the rotational speed of said mirror, and means operable optically to modify the operating speed of said shutter means, comprising telescope means interposed between the said face of said working element and said mirror, and operative to magnify the width of the beam reflected onto the face of said working element, said telescope means including an eyepiece lens of substantially the same cross-sectional area as said face and an objective lens of substantially the same cross-sectional area as said rotatable mirror.

2. Apparatus according to claim 1 wherein the eyepiece lens of said telescope is formed integrally with the light transmissive face of said working element, and the objective lens is formed integrally with said rotatable mirror.

3. Apparatus according to claim 2 and characterized in that the eyepiece lens of said telescope is concave.

4. Apparatus according to claim 1 and characterized in that said working element is an elongated crystal generally rectangular in cross section, and the light transmissive face comprises a concave eyepiece lens for said telescope, said face being formed as a section of a cylinder formed about an axis of curvature generally parallel to the axis of rotation of said rotatable mirror, and said rotatable mirror being formed as a cylindrical section having its axis of curvature substantially parallel with the axis of rotation of the mirror.

5. Apparatus according to claim 1 and characterized in that the working element is of a generally rectangular cross section, the telescope eyepiece being concave and formed integrally with the light transmissive face of the working element, the objective lens being formed integrally with the rotating mirror, said rotating mirror comprising a roof prism rotatable about an axis parallel to the centers of curvature of the objective lens and the eyepiece lens.

6. In laser apparatus, a working element capable of laser action, reflective shutter means for reflecting radiation emitted by said working element back into the latter, means for establishing the operating speed of said shutter means, and optical means operable to modify the operating speed of said shutter means, said apparatus being further characterized in that said shutter means comprises a rotatable mirror disposed to reflect radiation by said element in one of its rotated positions, and said optical means comprises telescope means interposed between said working element and said mirror and operative to magnify the width of the beam reflected onto said working element.

7. Apparatus according to claim 6 and further characterized in that said telescope comprises an eyepiece lens substantially of the diameter of the working element, and an objective lens, said rotating mirror and said objective lens being of a diameter greater than that of the working element, the magnification being a function of said differences in diameters of the recited lenses.

8. In laser apparatus, a generally cylindrically shaped ruby crystal capable of laser action having substantially planar, opposite end face portions, one face portion having partially light reflective means associated therewith and the other face portion being substantially totally light transmissive, a source of light energy for irradiating said ruby crystal to effect emission of a light beam by said other face portion, rotatable mirror means disposed for optical alignment with said other face portion in one of its rotated positions for returning the emitted light to said other face portion, means for rotating said mirror means at a predetermined rotational speed, means for intermittently energizing said source of energy in substantial synchronism with the recited optically aligned position of said mirror means, and means operable optically to modify the apparent rotational speed of said rotatable mirror means, said last recited means comprising means defining a telescope interposed between said crystal and said rotatable mirror means and operative to magnify the width of the beam of light as it is returned to said other face portion.

9. A laser generator comprising:
an active laser component having opposite ends disposed within an optically resonant cavity;
means for pumping said component so that a population inversion results thereby producing a negative temperature medium and means for emitting resulting laser light energy from said optically resonant cavity, said laser component having a first reflector proximate to one end and a second reflector spaced from the opposite end;
means for rotating said second reflector;
means for synchronizing said pumping means and said second reflector for attaining a maximum population inversion in said laser component; and
a telescope system, said telescope system having a power greater than unity when viewed from said laser component toward said second reflector, said telescope system being disposed within said cavity between said second reflector and said opposite end.

10. A laser generator as set forth in claim 9 wherein said telescope system comprises a Galilean telescope system including a first negative lens and a second lens.

11. The laser generator as set forth in claim 9 wherein said second reflector is a substantially totally reflecting prism.

12. The laser generator as set forth in claim 9 wherein said telescope system comprises first and second lenses, spatially disposed within said cavity along the cavity axis by an amount equal to the sum of the focal lengths of said lenses, so that the focal points of said lenses are a common point.

13. A laser structure comprising:
a laser component providing a segament of a wave-energy propagation path;
means for energizing said component to establish an inversion of energy states and thereby produce a negative temperature medium and means for emitting resulting laser light energy from said laser component;
a first wave-energy reflector terminating a first end of said propagation path;
means for terminating a second end of said propagation path including a second wave-energy reflector, rotatable to undergo angular displacement about an axis perpendicular to the axis of said laser component into and out of position reflectively terminating said second end of said propagation path;
means for effecting said angular displacement of said second wave-energy reflector successively into and out of said position to control the value of the ratio of wave-energy storage to wave-energy dissipation per wave-energy cycle within said path for wave-energy propagation along said path, and
a telescope system, said telescope system having a power greater than unity when viewed from said laser component toward said second wave-energy reflector, said telescope system being disposed between said second reflector and said laser component.

14. The laser structure as set forth in claim 13 wherein said telescope system is a Galilean telescope system including a first negative lens and a second lens.

15. The laser structure as set forth in claim 13 wherein said second wave-energy reflector is a substantially totally reflecting prism.

16. The laser structure as set forth in claim 13 wherein said telescope comprises first and second lenses, spatially disposed along said path by an amount equal to the sum of the focal lengths of said lenses, so that the focal points of said lenses are a common point.

17. A laser light source comprising: a body of laser material capable of population inversion between a normal and a higher energy state;
pumping means for attaining a population inversion in the laser material;
two reflectors arranged to define a resonant cavity about the laser material;
means for rapidly moving one of the reflectors in such manner as to produce a sudden increase in the Q of the resonant cavity immediately after a maximum population inversion has been attained in the laser material;
and characterized by an afocal magnifying optical system disposed within the resonant cavity in an optical path between the body of laser material and the movable reflector.

18. A laser according to claim 17, in which the afocal magnifying optical system comprises the two lenses of a Galilean telescope.

19. A laser light source comprising: a rod of laser material such as ruby;
pumping means for attaining a population inversion in that rod;
two reflectors arranged to define a resonant cavity about the said rod;
means for rotating one of the said reflectors in phase with the laser pumping means so as to produce a sudden increase in the Q of the resonant cavity immediately after a maximum population inversion has been attained in the rod;
and characterized by the disposition of the two lenses of Galilean afocal telescope in an optical path between the laser rod and the rotatable reflector.

20. A laser according to claim 19, in which the rotatable reflector has the form of a roof prism and in which the positive and negative optical surfaces of the Galilean telescope are formed on the roof prism and on the laser rod respectively.

* * * * *